Patented Dec. 4, 1934

1,982,828

UNITED STATES PATENT OFFICE 1,982,828

PROCESS OF PREPARING USED FILTERING MATERIAL FOR REVIVIFICATION

Arthur E. Pew, Jr., Bryn Mawr, and Leon A. Tarbox, Ridley Park, Pa., assignors to Sun Oil Company, Philadelphia, Pa., a corporation of New Jersey No Drawing. Application June 17, 1932, Serial No. 617,868

6 Claims. (Cl. 252—2)

The present invention relates to a process for preparing used filtering material for revivification by calcination and more particularly to a process for removing excess adsorbed and entrained oil from the filter clay or charcoal by means of a solvent and removing the adsorbed solvent.

In the normal manner of refining lubricating oil after distillation, the oil is given an acid treatment, after which the sludge formed by this treatment is permitted to settle and the supernatant oil decanted. After decanting, the oil is neutralized, either by an alkali wash or by agitation in contact with fuller's earth or by percolation through a bed of filtering material such as fuller's earth or charcoal, the use of fuller's earth being preferable. When the oil leaving the filter begins to run off test, the filtration is stopped and the excess entrained or adsorbed oil is blown out by means of steam or air, after which the clay while still in the filter is washed with naphtha, or other solvent for the oil, to remove oil not blown out. This washing may be either a continuous or batch process. In the former method the naphtha is merely pumped through the filter in the same direction in which the oil flowed during filtration. In the second method the naphtha or other solvent is admitted to the filter while the outlet valve is closed so as to merely fill the filter. After the naphtha has stood for a while, it is drained off and the process repeated until the naphtha on removal shows that the oil has been substantially removed. The clay will now contain quite a bit of adsorbed and entrained solvent which is removed by blowing with steam.

The present invention relates to a method for blowing out and removing both the oil, after filtration has been stopped, and the solvent, after the washing has been completed. In the case where the surplus oil is blown out by means of air, the operation is extremely unsafe and also injurious to the oil which is removed, for the reason that the oil in its heated condition is very readily oxidized and passage of the air therethrough tends to oxidize and thereby discolor the oil. If the filter is then dumped without resorting to the naphtha wash, it is very often found that a combustible mixture has been formed by the air and oil, and the clay on striking the atmosphere sometimes bursts into flame, due to the heat generated by the oxidation and formation of the combustible mixture of air and oil vapors. Blowing with steam is undesirable since a portion of the steam will condense and form a substantially stable emulsion with the oil, thereby rendering it unfit for use without further treatment.

The blowing out of the excess naphtha adsorbed during the washing process by means of steam or air is also undesirable. If air is used a combustible mixture is formed, and oxidation also sets in in the same manner as described in connection with the blowing out of the excess oil. Filters have been known to explode during this blowing operation. If steam is used, a portion condenses and hydrates the fuller's earth thereby complicating its revivification by calcination, as the water must be removed during the calcining operation before the contained organic matter and carbon can be successfully burned out.

If the neutralization and filtering process is used, the blowing out of the oil and naphtha by means of steam is not only undesirable, but highly injurious to the filter, as the filtering process removes finely divided acid sludge and $SO_2$ contained in the oil. The acid sludge contains a certain amount of free sulphuric acid which on being diluted by any condensed steam attacks the filter wall, which is metallic, and in a short time renders the filter unfit for use due to the corroded condition of the wall. The $SO_2$ removed from the oil acts in the same manner, when absorbed by any condensed steam, forming sulphurous acid.

The object of the present invention is to safely remove oil and solvent adsorbed by the filtering material or held in the capillary spaces between the particles of the filtering material by blowing out the same with an inert gas or other inert substance which will prevent oxidation of the oil and naphtha and which will not dilute or dissolve any acid, or acid forming substance, present in the filtering material.

It has been found that flue gases are the cheapest and possibly the best agent for carrying out the present invention, due to the fact that they contain large percentages of carbon dioxide ($CO_2$). These gases may be ordinary stack gases or may be generated by burning any suitable fuel in a special combustion chamber wherein the combustion is so regulated as to exclude an excess of air. The gases are then preferably washed and, if necessary, heated before use.

In practicing the present invention, the oil feed to the filter is discontinued when the filtered oil, on testing, shows that the filtering material is approaching the end of its usefulness.

Flue gas is then admitted to the inlet end of the filter under a pressure approximating 10–25 pounds per square inch. When all the oil that it is possible to displace has been displaced, the washing is begun. As before stated, the washing may be accomplished by continuously flowing the solvent (naphtha, etc.) through the filter in the same direction as that traveled by the oil during filtration, or the batch method may be used, in which the filter is successively filled up and emptied until all lubricating oil possible has been removed in solution. The solvent and oil are then separated by well known distillation processes. After washing, the filter is blown with heated combustion gases to remove the adsorbed solvent. It is necessary in this instance to use heated gases as all of the solvent remaining in the filtering material is adsorbed and cannot be removed by blowing alone. The heated gas vaporizes the adsorbed solvent at a temperautre below its ordinary boiling point due to the partial pressure effect of the heated flue gas. The mixture of vaporized solvent and flue gas escaping from the filter is run through a condenser to condense and recover the vaporized solvent.

While the present invention has been described as applied to percolating filtration it is to be understood that the invention may also be applied to the recovery of adsorbed and entrained oil from filtering material used in a contact filtering operation. In refining oil by the contact method it is usually treated with acid in an agitator, the major portion of the sludge is permitted to settle, and the oil decanted. Filter clay is then mixed with the acid treated oil, the mixture heated and then thoroughly agitated. After sufficient time of agitation the filtering material is removed by passing the mixture through a filter press. This operation removes any sludge with the filtering material. When a sufficient amount of clay has accumulated in the filter press the supply of oil and clay mixture to the press is discontinued and some of the entrained and adsorbed oil is removed by blowing with air or steam. After the blowing operation, the clay is usually washed with naphtha to remove more oil. This is followed by another blowing with heated gas to vaporize and remove the naphtha.

It is evident that the blowing operations with air or steam in the contact method have the same disadvantages set forth for the percolating method. Steam will unite with the $SO_2$ and form $H_2SO_4$ in the clay and attack the cloth filter bags and if the press is not constructed of special, costly acid resisting metal, the acids will also attack the filter plates and body. The steam will also tend to form a more or less stable emulsion with the entrained or adsorbed oil. Air will tend to oxidize the oil and also form an explosive mixture with the oil and naphtha.

From the foregoing it is readily seen that the substitution of combustion gases, $CO_2$ or other inert gas for the air or steam used in the blowing operation is a desideratum in the contact method as well as in the percolating method.

While the present invention has been described as being used for preparing used mineral oil filtering material for revivification it is to be understood that filtering material which has been used for removing color bodies etc., from vegetable oils may be treated in a like manner without departing from the spirit and scope of the invention.

It is evident from the foregoing that the present process is effective for preparing filtering material for revivification in such a manner as to preclude the oxidation or emulsification of any adsorbed and recoverable oil. It also prevents any liability of explosions while blowing out, or fire while dumping. If the acid treatment and neutralization by filtration process is used, the present process effectively prevents any possibility of the filter walls being attacked and corroded by the acid and acid forming substances adsorbed by the clay.

While flue gas has been given as the specific substance used in this process, it is to be understood that other gases which are inert and which will not cause, either by themselves, or together with any matter adsorbed in the clay, a corrosive action on the filter may be used.

It is also necessary that the gas be non-oxidizing and one which will not support combustion. For instance, either pure carbon dioxide or nitrogen.

If such other gases are used, the procedure followed is identical with that above described in connection with furnace gases.

We claim:

1. The process of preparing used oil filtering media for revivification comprising displacing adsorbed and entrained oil with an inert gas, washing the media with a solvent for the oil to further recover usable oil, and then displacing the adsorbed and entrained oil solvent with an inert gas from which water will not condense at the initial and final temperatures of the filtering medium.

2. The process of preparing used oil filtering media for revivification comprising displacing adsorbed and entrained oil with combustion gases, washing the media with a solvent for the oil to further recover usable oil, and then displacing the adsorbed and entrained oil solvent with combustion gases.

3. The process of preparing used oil filtering media for revivification comprising displacing adsorbed and entrained oil with carbon dioxide, washing the media with a solvent for the oil to further recover usable oil, and then displacing the adsorbed and entrained oil solvent with carbon dioxide.

4. The process of recovering usable oil from a media used to filter and remove acid sludge bodies from the same comprising displacing some of the adsorbed and entrained oil with a gas which is non-oxidizing and which will not dissolve acid substances in the media, washing the media with a solvent for the oil to recover further adsorbed and entrained oil, and then displacing the solvent with a gas which is non-oxidizing and which will not in condensation dissolve acid substances in the media.

5. The process of recovering usable oil from a media used to filter and remove acid sludge-bodies from the same comprising displacing some of the adsorbed and entrained oil with combustion gases, washing the media with a solvent for the oil to recover further adsorbed and entrained oil, and then displacing the solvent with combustion gases.

6. The process of recovering usable oil from a media used to filter and remove acid sludge bodies from the same comprising displacing some of the adsorbed and entrained oil with carbon dioxide, washing the media with a solvent for the oil to recover further adsorbed and entrained oil, and then displacing the solvent with carbon dioxide.

ARTHUR E. PEW, JR.
LEON A. TARBOX.